United States Patent [19]

Zacky

[11] 4,157,852
[45] Jun. 12, 1979

[54] PANEL SUPPORT SYSTEM

[76] Inventor: Ralf G. Zacky, 1933 Parnell Ave., Los Angeles, Calif. 90025

[21] Appl. No.: 863,942

[22] Filed: Dec. 23, 1977

[51] Int. Cl.² .................. A47F 3/00; F16B 12/00
[52] U.S. Cl. ................... 312/140; 40/152; 40/606; 52/282; 220/84; 312/263
[58] Field of Search ............. 312/140, 263, 257 SK, 312/257 R, 107, 108; 52/282, 280; 40/152, 156, 605, 606; 220/84, 431

[56] References Cited

U.S. PATENT DOCUMENTS

| | | | |
|---|---|---|---|
| 2,174,180 | 9/1937 | Rand | 312/140 |
| 3,150,903 | 9/1964 | Chapman et al. | 312/140 |
| 3,370,389 | 2/1968 | Macaluso | 52/282 |
| 3,859,767 | 1/1975 | Aspenwall | 52/280 |

Primary Examiner—Mervin Stein
Assistant Examiner—Alex Grosz
Attorney, Agent, or Firm—Charles H. Schwartz

[57] ABSTRACT

A support system for panel members including an outer frame including at least four tubular members interconnected at end portions by joints to form the outer frames, an inner frame including at least four moldings extending along and complementary to the tubular members to form the inner frame and with the inner frame located within the outer frame, the moldings each including a groove extending along the length of the molding and with the groove having a configuration to receive a portion of the tubular member and with the grooves providing for the inner frame interlocked within the outer frame, and the moldings each including a channel extending along the length of the molding and with the channels receiving and supporting a panel member within the inner frame.

19 Claims, 8 Drawing Figures

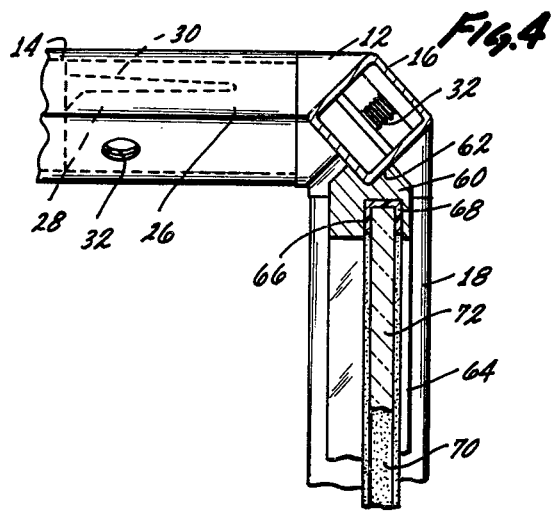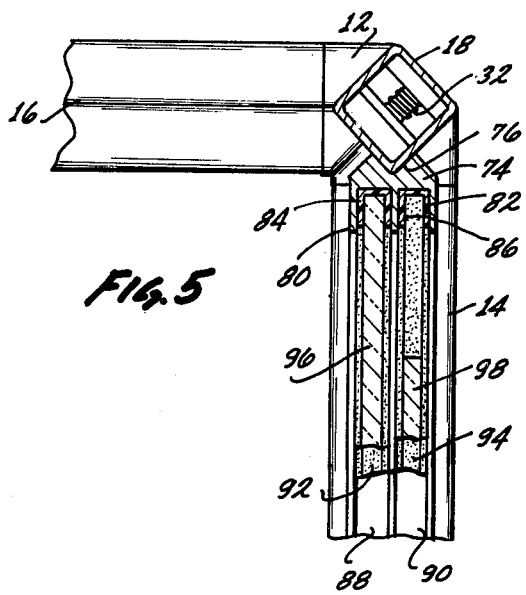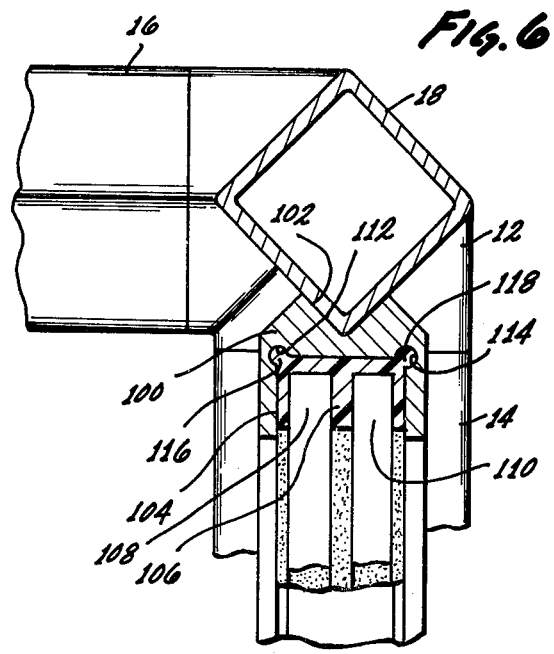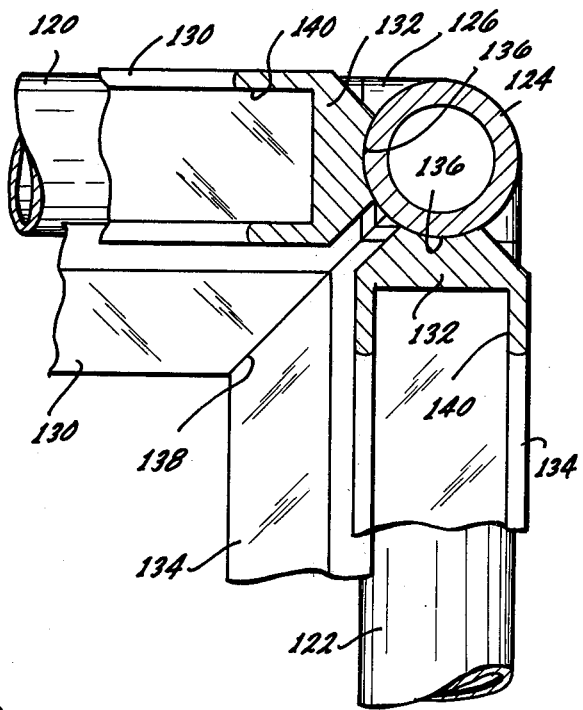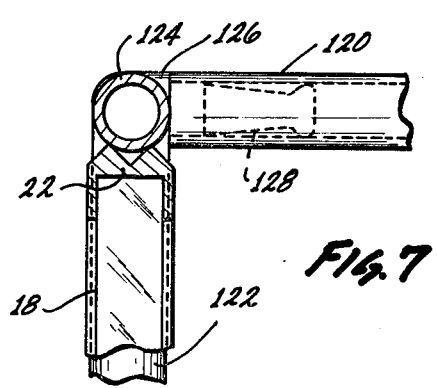

PANEL SUPPORT SYSTEM

The present invention is directed to a unique structure for a display case or other structures having panels locked in position and specifically to a molding used in association with an existing shelf and display systems to provide for such display cases.

There is presently on the market a number of shelf and display systems that use lengths of tubing interconnected by joint members to provide for various configurations of open shelves and other types of display structures. One type of such shelf and display system currently on the market uses square tubing and is referred to as the Reflected System since the square tubing is presented to a viewer of the system with an angular presentation. In addition, there are other such shelf and display systems which are on the market which use other configurations for the tubing such as round tubing and the present invention may be used with these other type of shelf and display systems to provide for display cases or other structures having panels locked in position.

In the past, display cases or the like are normally manufactured using permanently joined members which can receive and support glass or wall panels and normally have a provision for sliding doors on one side of the display case to provide for access into the interior of the display case. These display cases or the like are normally manufactured with particular configurations for the support members which would not match the various shelf and display systems which are currently on the market. The present invention provides for display cases or the like which match the shelf and display systems presently on the market since the present invention incorporates the shelf and display systems currently on the market as part of the display case or the like.

Specifically, a particular type of system currently on the market, such as the Reflected type of shelf and display system, may be used to construct a box-like structure and with each side of the box having outer frames formed by the reflected tubing members. The present invention includes auxiliary moldings that fit within the outer reflected tubing frames on each side of the Reflected structure. As an example, each molding may include a groove extending along the molding on the top of the molding and with the groove designed to accept the angular portion of each reflective member. Four of such moldings are used for each side of the display case and thereby form an inner frame located and locked within the outer frame.

The sides of the moldings are tapered inward toward the groove at the top so that moldings located along each side of the display case are clear of the moldings on the adjacent side of the display case. This allows moldings to be positioned along one side of the box-like structure to form, for example, support for a front face for the display case and moldings may be positioned along another side to form, for example, support for a top face of the display case. The moldings would normally form inner frames for all of the sides of the display case so as to support either glass or solid panels and also to support sliding panels so as to provide for a completely enclosed display case.

It is also to be appreciated that in addition to providing for display cases, the use of the moldings may provide for supporting other types of panel members so that the shelf and display system may be used to make dressing rooms or partitions or any other type of use where a solid member is to be supported and locked within a vertical portion or a horizontal portion of a shelf and display system.

The moldings also include a channel which extends along the length of the molding on the bottom and which is opposite the groove and with the channel designed to receive and support solid panels such as glass or opaque panels and with the panels either fixed in position or sliding within the channel. Specifically, for one embodiment of the invention, the channel may be wide enough so that different types of plastic extrusions can be inserted within the channel and with the different types of plastic extrusions either supporting a single panel such as glass or a pair of panels such as glass which may slide relative to each other. In this way, the elongated moldings may have the same configuration for all sides of the display case.

As another embodiment of the invention, different moldings may be provided having different size channels so that one molding may have a channel with an opening of a size to receive a single panel such as glass or opaque material and with another molding having a larger channel which may receive a pair of sliding glass or opaque panels. The invention may also include means for locking the plastic extrusions within the channels so that the plastic extrusions will be maintained in position during assembly of the display case.

The present invention, therefore, provides for using existing shelf and display systems in combination with moldings for supporting and locking panel members to produce wall portions and with a plurality of such interrelated wall portions forming partitions or dressing rooms or for forming a completely enclosed space such as a display case.

A clearer understanding of the invention will be had with reference to the following description and drawings wherein FIG. 1 illustrates a display case or the like constructed in accordance with the teachings of the present invention and using a reflective shelf and display system to form the outer framework of the display case;

FIG. 4 illustrates a detail of a corner of a display case showing a second embodiment of a molding for use in supporting a single panel member;

FIG. 5 illustrates a detail of a corner of a display case showing a third embodiment of a molding for use in supporting a pair of panel members;

FIG. 6 illustrates a detail of a corner of the display case showing a modification of the molding including means for locking a plastic extrusion in place;

FIG. 7 illustrates the use of the molding of FIGS. 2 and 3 in association with a shelf and display system using round tubular members; and FIG. 8 illustrates a modification of the molding shown in FIG. 7 and specifically adapted for use with the round tubular frame members.

Figure 1:
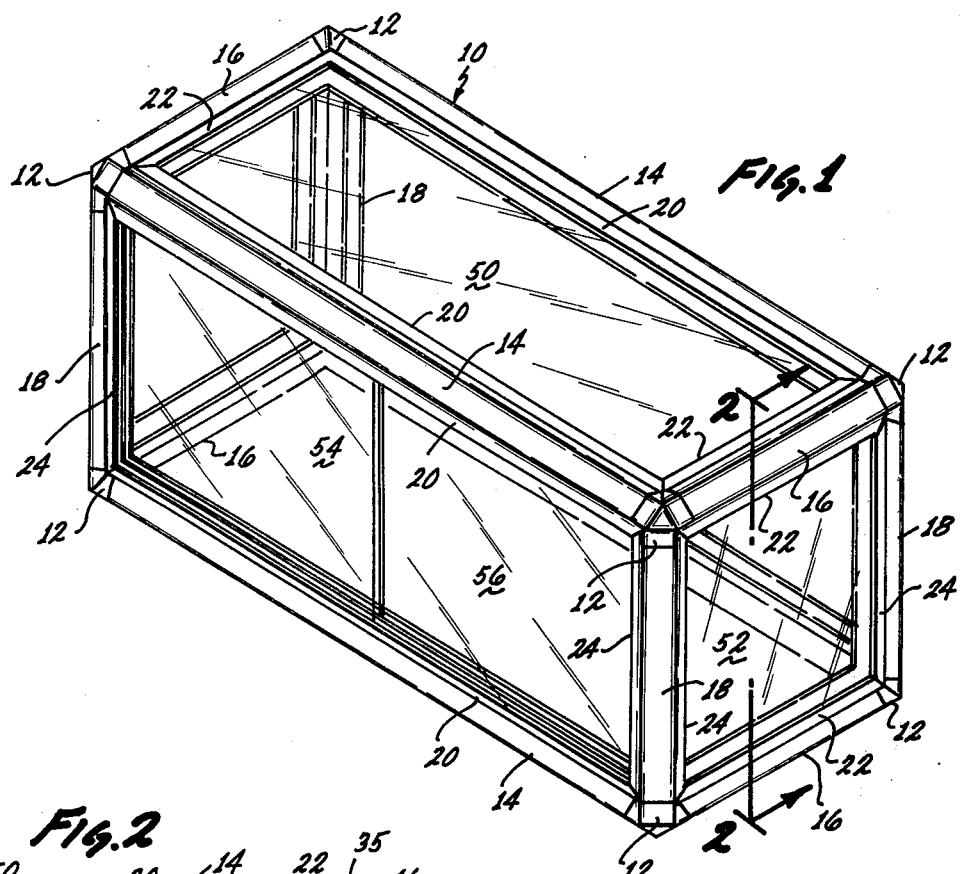

FIG. 1 illustrates a display case 10 constructed in accordance with the teachings of the present invention and using a reflective shelf and display system to provide for the complete outer frame for the display case. It is to be appreciated that although the present invention is generally described with reference to display cases, the concepts of the invention may be used to provide for other structures. For example, a shelf and support system such as the reflective type may be used in conjunction with the molding of the present invention to provide for structures such as dressing rooms or partitions or any type of structure wherein a panel is to be supported and locked in position.

The display case 10 is constructed using square tubing turned angularly towards a viewer and with the square tubing joined at the corners using joints 12. Specifically, as shown in FIG. 1, a plurality of square tubes define the width of the display case 10. A plurality of square tubes 16 define the depth of the display case 10. Finally, a plurality of square tubes 18 define the height of the display case 10. Each joint 12 interconnects three square tubes in positions orthogonal to each other and each side of the display case 10 is framed by four interconnected square tubes. Also it can be seen that each square tube is part of the outer frame for two adjacent sides of the display case since adjacent sides are at right angles to each other.

Each side of the display case 10 is as indicated above and the outer frame for each side is formed by four square tubes joined together at their ends by joint members 12. Located within each side of the display case 10 are a plurality of moldings which are arranged to form an inner frame within each outer frame. Individual ones of a plurality of moldings 20 are adjacent individual ones of the square tubes 14. Similarly moldings 22 are adjacent square tubes 16 and moldings 24 are adjacent square tubes 18. Four moldings therefore form an inner frame for each side of the display case 10 and with each end of each molding mitered so that each inner frame fits within each outer frame.

Figure 2:
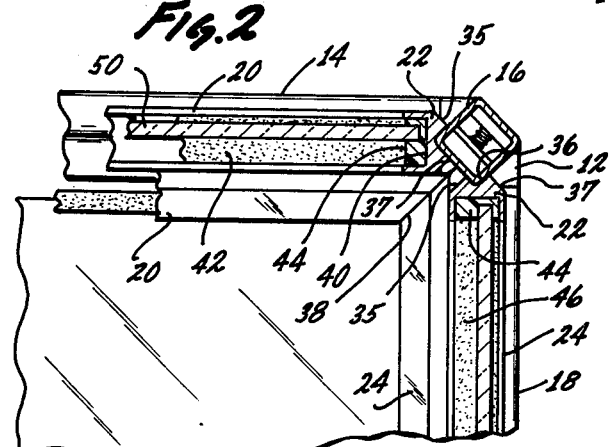
FIG. 2 illustrates a cross-sectional view of the display case of FIG. 1 taken along lines 2—2 of FIG. 1.

FIG. 2 illustrates a cross-sectional view of a portion of the display case of FIG. 1 taken along lines 2—2 in FIG. 1. In FIG. 2 the various outer frame members 14, 16 and 18 are shown interconnected by the joints 12. The inner frame members 20, 22 and 24 are also shown to lie adjacent to the outer frame members 14, 16 and 18 and interlock with each other and with the outer frame members.

Figure 3:
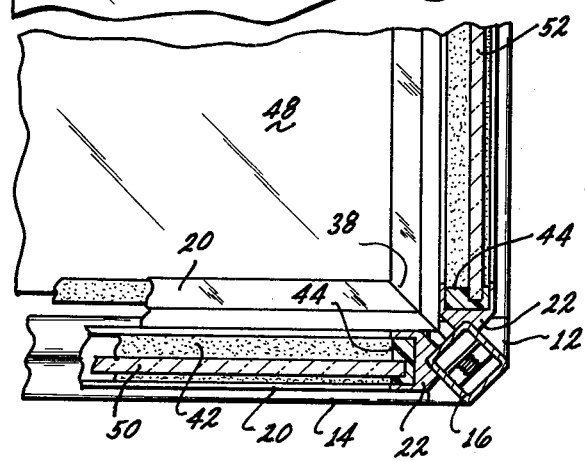
FIG. 3 illustrates a detailed view of a corner of a display case showing a first embodiment of a molding for use in supporting a single or a double panel.
Figure 3:
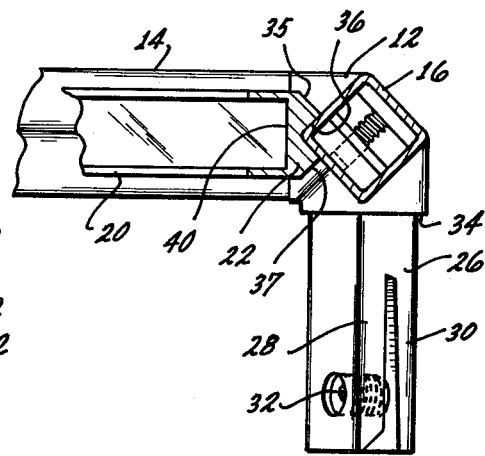

FIG. 3 illustrates an enlarged view of one corner of the display case 10 and shows an exposed portion of one of the joints 12. Each of the joints 12 includes extensions, such as extension 26, which extend outwardly and fit within the end of the square tubing. Each extension 26 is split into two arms such as arms 28 and 30 and with a threaded member such as screw 32 threaded through an arm member 28 and pressing against arm member 30. Each end of each square tube includes an opening complementary to the position of the screw 32. It can be seen that, when the screw 32 is not in contact with the arm member 30, the square tubing may be slipped over the extension 26 to abut a wall portion 34 of the joint 12. The screw 32 may be turned to contact the arm member 30 to spread the arm members 28 and 30 and thereby lock the extension 26 within the square tubing. This type of structure provides for a very rigid coupling of the square tubes to the joints 12 and additional provides for rapid assembly and disassembly when desired.

Each of the moldings 20, 22 and 24 are essentially similar in configuration except for their length so that all of the moldings forming the inner frames will have similar construction. Specifically, as shown in FIGS. 2 and 3, the moldings 20, 22 and 24 each includes a groove 36 which has a configuration to receive the angle formed by two adjacent sides of the square tubes 14, 16 and 18. In this way, as each group of four of the moldings are positioned to form an inner frame and are mitered to abut each other as shown by the miter joints 38 in FIG. 2, each inner frame is locked in position within a corresponding outer frame formed by four tubular members.

Each molding is tapered toward the groove 36 as shown by side portions 35 and 37 in FIG. 2 for moldings 22 which are adjacent to each other. In this way moldings which are adjacent to and 90° from each other do not interfere with each other. If the moldings were much smaller, then it would not be necessary to taper the sides adjacent the grooves.

In addition, each of the moldings 20, 22 and 24 includes a channel 40 opposite the groove 36. Each of the channels 40 receive a plastic extrusion such as extrusions 42, 44 and 46 shown in FIG. 2 and with each extrusion having a length complementary to the channel in which it is positioned. Each extrusion includes a groove to receive and support a sheet of solid material such as the panes of glass 48, 50 and 52.

The panes of glass 48, 50 and 52 are supported within the grooves in each plastic extrusion and with four of the plastic extrusions forming part of the inner frame so that each pane of glass is rigidly retained in position along all four edges. Actually, each pane of glass tends to rigidify the frame structure since all four moldings forming the inner frame are not only mitered at the corners but are also supported by the pane of glass. Each pane of glass thereby locks the moldings against the square tubular members. The resultant structure provides for a very rigid construction with the use of the inner and outer frame members and with a panel member such as a frame of glass extending across each side of the display case 10. As shown in FIG. 1 all of the sides of the display case 10 are essentially of the same construction with the exception of the one side whch may have a pair of sliding members 54 and 56. Also it is to be appreciated that although the sides are shown to be of glass, it may be desired to use an opaque material such as wood or masonite for one or more of the sides such as the bottom.

FIG. 4 illustrates the use of an alternative configuration for a molding and with a plurality of such moldings used to form the inner frames. The molding, as shown in FIG. 4, is specifically designed to support only a single panel such as a pane of glass. FIG. 5 illustrates another configuration for molding and with a plurality of such moldings used to form an inner frame. The molding, as shown in FIG. 5, is specifically designed to support either single or double panels and may be used to support two panels such as two panes of glass which slide relative to each other.

In FIG. 4 a molding 60 includes a groove 62 extending along the length of the molding and which groove is V-shaped to receive the angular portion of the square tube 16. A substantially identical molding 64 would also include a V-shaped groove (not shown) so as to mate with the square tube 18. The molding 60 includes a channel 66 extending along the length of the molding and on the side opposite the groove 62. The molding 64 would have a similar channel. A plastic extrusion 68 is positioned within the channel 66 and a plastic channel 70 is positioned within the channel in the molding 64. It can be seen that the channels and the plastic extrusions are designed so as to support only a single panel such as a pane of glass 72. The molding 60 and similar moldings having various lengths may, therefore, be used to form the inner frames and to provide for the support of a single panel of desired material.

FIG. 5 illustrates the use of a molding 74 having a V-shaped groove 76 to receive the angular portion of the square tube 18. A similar molding 78 also has a V-shaped groove (not shown) so as to receive the angular portion of the square tube 14. The molding 74 includes a pair of channels 80 and 82 and with each channel receiving a plastic extrusion 84 and 86. The molding 78 includes similar channels 88 and 90 to receive similar plastic extrusions 92 and 94. A pair of panel members such as panes of glass 96 and 98 may be positioned within the channels and plastic extrusions and, as shown in FIG. 1, the panels may be each slightly more than half of the length of the side of the display case. In this way, each panel may be slid within the channels to provide for access within the interior of the display case. The molding shown in FIG. 5 may also be used to support a single panel if desired.

FIG. 6 illustrates yet another embodiment of the invention and specifically is directed to the use of a molding 100 which may be used to support a pair of panels such as the panels 54 and 56 shown in FIG. 1. Specifically, the molding 100 includes a groove 102 extending along one side of the molding 100 and having a configuration to receive the angular portion of the square tube 18. Actually, the molding 100 is substantially identical in configuration to the moldings 20, 22 and 24 shown in FIGS. 1 through 3 and has a channel 104 of substantially the same size as the channel 40 shown in FIG. 3. Also, the molding 100 includes a plastic extrusion 106 which forms two recesses 108 and 110 so as to receive two panels such as panels 54 and 56 shown in FIG. 1. The panels 54 and 56 may slide relative to each other to provide access to the interior of the display case.

Therefore, with the embodiment of the invention shown in FIGS. 1 through 3 and through the use of a plastic extrusion such as shown in FIG. 6, one size molding can be used to support either a single or double panels for the sides of the display case. This is in distinction with the use of two different configured moldings as shown in FIGS. 4 and 5 to provide for either the single or double panels.

In FIG. 6, the molding 100 includes a further modification which could be used with any of the molding configurations shown in FIGS. 1 through 6. Specifically, in FIG. 6, the molding 100 includes small cutouts such as circular cutouts 112 and 114 which extend along the length of the molding. In addition, the plastic extrusion 106 includes complementary beads 116 and 118 which beads extend along the length of the extrusion 100. The plastic extrusion may be slid into the molding before assembly into frames and with the beads 116 and 118 sliding into the cutouts 112 and 114 to lock the plastic extrusion within the molding. As indicated above, all of the moldings as shown in FIGS. 1 through 5 could include at least one cutout and bead to lock the plastic extrusion within the molding and the particular form for the cutout and bead may take various configurations.

FIG. 7 illustrates the use of the moldings such as the moldings 18 and 20 in combination with a shelf and display system using round tubular members. Specifically, one corner of an outer frame is formed from round tubular members 120, 122 and 124 interconnected by a joint 126. The joint 126 includes a plurality of extensions such as extension 128 which is inserted into the open end of the round tubular member such as tubular member 120. The extensions are force fit into the tubular members so as to interlock all of the tubular members at each corner. The V-shaped groove of the moldings lie against the round tubular members and when four of the moldings are used to form an inner frame, the groove provides for the locking of the inner frame within the outer frame formed by the round tubular members. Plastic extrusions and panel members would be used to form the display case in the same manner as illustrated in FIGS. 1 through 6.

FIG. 8 illustrates yet another embodiment of the invention using moldings in combination with a shelf and display system incorporating round tubular members 120, 122 and 124. Specifically, in FIG. 8 moldings 130, 132 and 134 are provided and which moldings include a circular groove 136 which groove has a configuration to match the periphery of the tubular members. Four moldings form each inner frame and the ends of the moldings are mitered as shown by miter joint 138 so that each inner frame is locked within each outer frame formed by the tubular members. The moldings all include channels such as channels 140. The channels may receive plastic extrusions or the channels may have configurations as shown by by the previous embodiments of the invention illustrated in FIGS. 1 through 6.

It is also to be appreciated, as indicated above, that although the invention has been described with reference to a display case, the structure of the present invention may also provide for other configurations such as dressing rooms or partitions, or any other structure wherein a panel member is to be supported and locked within a shelf and display system.

Although the invention has been described with reference to particular embodiments, it is to be appreciated that various adaptations and modifications may be made and the invention is only to be limited by the appended claims.

I claim:
1. A support system for panel members, including,
an outer frame located within a particular plane and including at least four tubular members each having substantially the same cross-section interconnected at end portions by joints to form the outer frame, and with the four tubular members located within the particular plane,
an inner frame located within the particular plane and including at least four moldings each having substantially the same cross-section extending along and complementary to the tubular members to form the inner frame and with the inner frame located within the outer frame and within the particular plane,
the moldings each including a groove extending along the length of the molding and with the groove having a configuration to receive a portion of the outer surface of the tubular member and with the grooves providing for the inner frame interlocked within the outer frame, and
the moldings each including a channel extending along the length of the molding and with the channels receiving and supporting a panel member within the inner frame and within the particular plane.
2. The support system of claim 1 wherein the channel is of a size to receive only a single panel.

3. The support system of claim 1 wherein the channel is of a size to receive either a single panel or a double panel.

4. The support system of claim 1 additionally including an elongated plastic extrusion positioned within each channel and with the plastic extrusion including an opening extending along its length to receive and support the panel member.

5. The support system of claim 4 wherein the plastic extrusion includes a bead extending along the length of the extrusion and wherein the molding includes a cutout in the channel and complementary to the bead to have the extrusion locked within the channel.

6. The support system of claim 4 wherein the plastic extrusion has an opening to receive only a single panel.

7. The support system of claim 4 wherein the plastic extrusion has an opening to receive either a single panel or a double panel.

8. The support system of claim 1 wherein the tubular members are square and turned angularly and the grooves in the moldings are V-shaped to receive a complementary portion of the tubular members.

9. The support system of claim 1 wherein the tubular members are round and the grooves in the moldings are curved to receive a complementary portion of the tubular members.

10. The support system of claim 1 for use with at least two panel members 90° to each other including a plurality of groups of outer frames extending along at least two planes 90° to each other and with at least one tubular member forming part of the frames for two frames and with at least the one plane of the moldings adjacent to and 90° from each other tapered toward the groove so the moldings do not interfere with each other.

11. The support system of claim 1 including a plurality of outer frames to form a complete box to provide an enclosed display case and wherein the moldings form inner frames to support panels on all sides of the outer frame.

12. A molding for supporting panel members in combination with a shelf and display system of the type wherein an outer frame is formed in a particular plane of at least four tubular members each having substantially the same cross-section and each interconnected at end portions by joints and with the moldings each having substantially the same cross-section including a groove extending along the length of the molding and with the groove having a configuration to receive a portion of the outer surface of the tubular member to provide for the moldings interlocked with the tubular member, a channel extending along the length of the molding and with the channel receiving and supporting a panel member within the particular plane, and with at least four moldings forming an inner frame within the particular plane and extending within and complementary to the tubular members forming the outer frame.

13. The molding of claim 12 wherein the channel is of a size to receive only a single panel.

14. The molding of claim 12 wherein the channel is of a size to receive either a single panel or a double panel.

15. The molding of claim 12 for use with square tubular members which are turned angularly and with the groove in the molding V-shaped to receive a complementary portion of the tubular member.

16. The molding of claim 12 additionally including an enlongated plastic extrusion positioned within each channel and with the plastic extrusion including an opening extending along its length to receive and support the panel member.

17. The molding of claim 16 wherein the plastic extrusion includes a bead extending along the length of the extrusion and wherein the molding includes a cutout in the channel and complementary to the bead to have the extrusion locked within the channel.

18. The molding of claim 16 wherein the plastic extrusion has an opening to receive only a single panel.

19. The molding of claim 16 wherein the plastic extrusion has an opening to receive either a single panel or a double panel.

* * * * *